US005725062A

United States Patent [19]
Fronek

[11] Patent Number: 5,725,062
[45] Date of Patent: Mar. 10, 1998

[54] VEHICLE TOP SOLAR POWER GENERATOR

[76] Inventor: Paul A. Fronek, P.O. Box 341, Paisley, Fla. 32767

[21] Appl. No.: 662,664

[22] Filed: Jun. 17, 1996

[51] Int. Cl.⁶ .................................................. B60L 9/00
[52] U.S. Cl. ........................ 180/2.2; 180/165; 180/65.3
[58] Field of Search ........................... 180/2.2, 165, 65.1, 180/65.3, 65.8

[56] References Cited

U.S. PATENT DOCUMENTS

| | | | |
|---|---|---|---|
| 4,181,188 | 1/1980 | Dessert | 180/2 A |
| 4,592,436 | 6/1986 | Tomei | 180/2.2 |
| 4,602,694 | 7/1986 | Weldin | 180/2.2 |
| 4,605,813 | 8/1986 | Takeuchi et al. | 136/244 |
| 4,744,430 | 5/1988 | McCoy | 180/2.2 |

FOREIGN PATENT DOCUMENTS

| | | |
|---|---|---|
| 63-71420 | 3/1988 | Japan . |
| 5131952 | 5/1993 | Japan . |

OTHER PUBLICATIONS

Electrical Review Article, Oct. 22, 1976.

*Primary Examiner*—Richard M. Camby
*Attorney, Agent, or Firm*—Edward M. Livingston, Esq.

[57] ABSTRACT

A vehicle-top solar-power generator has a Photovoltaic frame (2) with mounting brackets (3) that are positioned on a top (4) of a vehicle (5) with a cooling space between the top of the vehicle and the photovoltaic frame. At least one and preferably a plurality of Photovoltaic panels (1) are positioned in the Photovoltaic frame and covered with a light-transmittable material (28) such as plexiglass or a screen of suitable material. Direct current generated from the Photovoltaic panels is transmitted to a primary battery (6), to a secondary battery (7), to AC electrical items (13) and to DC electrical items (14). Power generated in excess of needs for the vehicle is inverted to alternating current for electrical items in such structures (15) as a home, workplace, recreational vehicle, boat or other structure near the vehicle. A cooling fan (12) powered by current from the Photovoltaic panels is used to cool the Photovoltaic panels. Control regulators control flow of current from the Photovoltaic panels to one or more batteries for charging, for inverting to AC current and for distribution of AC current and DC current for nearby use.

13 Claims, 3 Drawing Sheets

1

VEHICLE TOP SOLAR POWER GENERATOR

BACKGROUND OF THE INVENTION

This invention relates to solar power for vehicles and in particular to a solar-power generator that is attachable to a top of a vehicle such as a golf cart, motor home, car or boat to supplement electrical supply for powering the vehicle and electrical components of the vehicle or for powering electrical items that are not related to operation of the vehicle and are positioned close by in a home, office, recreational vehicle, boat or in the same vehicle or in another vehicle.

Solar-power generators for vehicles have been known and under development for decades. None, however, have been easily attachable with attachment means, structure and circuitry that enhance generation efficiency, convenience and versatility of use in a manner taught by this invention.

Examples of different solar-power generators for vehicles are described in the following documents. U.S. Pat. No. 4,744,430, issued to McCoy on May 17, 1988, described a solar-powered golf cart having groups of solar panels connected in parallel to a separate battery for each group of panels on a flexible mounting that fit directly onto tops of golf carts. U.S. Pat. No. 4,602,694, issued to Weldin on Jul. 29, 1986, was limited to a detailed combination of motor, generator, a traction wheel and other devices. U.S. Pat. No. 4,605,813, issued to Takeuchi et al on Aug. 12, 1986, taught a flexible silicon solar battery positional on an amorphous insulating layer that was positioned directly on a top of a structure to be powered. U.S. Pat. No. 4,592,436, issued to Tomei on Jun. 3, 1986, taught a solar-powered vehicle having a bottom solar panel mounted directly to an exterior surface of the vehicle and a top panel attached pivotally to the bottom solar panel. U.S. Pat. No. 4,181,188, issued to Dessert on Jan. 1, 1980, described a vehicle which combined muscle power and wind power with solar energy for propulsive power. Various articles such as appeared in Electrical Review, Vol. 199 on 22 Oct., 1976, have provided logic but not actual design for solar-powered cars. Other patents found have been less relative to this invention.

SUMMARY OF THE INVENTION

In light of a publicly perceived need for solar energy for transportation or supplementation of power, objects of this invention are to provide a vehicle-top solar-power generator which:

Can be mounted onto tops of golf carts, motor homes, boats, cars and other vehicles without modification or special construction of their tops;

Has a cooling system between it and the vehicle top for increased thermal efficiency in generation of electrical power from the sun;

Is provided with electrical communication to electrical components in the vehicle and in nearby structures for use of excess power generated in excess of power to charge storage batteries for propulsion;

Provides charging of propulsion batteries and other system-related batteries with independent current such as commercial power at buildings and homes where the vehicle is parked;

Is interactive automatically with separate power sources such as commercial power and standby generators; and Is economical and convenient to use.

This invention accomplishes these and other objectives with a vehicle-top solar-power generator having a photovoltaic frame with mounting brackets that are positioned on a top of a vehicle with a cooling space between the top of the vehicle and the photovoltaic frame. At least one and preferably a plurality of photovoltaic panels are positioned in the photovoltaic frame and covered with a light-transmittable material such as plexiglass or a screen of suitable material. Direct current generated from the photovoltaic panels is transmitted to a propulsion battery and to direct-current (DC) electrical components of the vehicle to the extent needed for charging the propulsion battery and for operating the direct-current electrical components. Power generated in excess of direct-current needs for the vehicle is inverted to alternating current (AC) for use on the vehicle and in such structures as a home or other stationary or mobile structure near the vehicle. A preferably 36-volt charge controller regulates current flow to one or more batteries for vehicle propulsion and for inversion to AC use. A preferably 12-volt charge controller regulates current flow to one or more preferably 12-volt batteries for powering electrical items directly and for inversion for AC use remotely from the vehicle. A cooling fan powered by the photovoltaic panels is used to cool the photovoltaic panels to the extent that a fan motor does not use more power than it helps to generate with heat dissipation by the cooling fan.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

DESCRIPTION OF A PREFERRED EMBODIMENT

Figure 1:
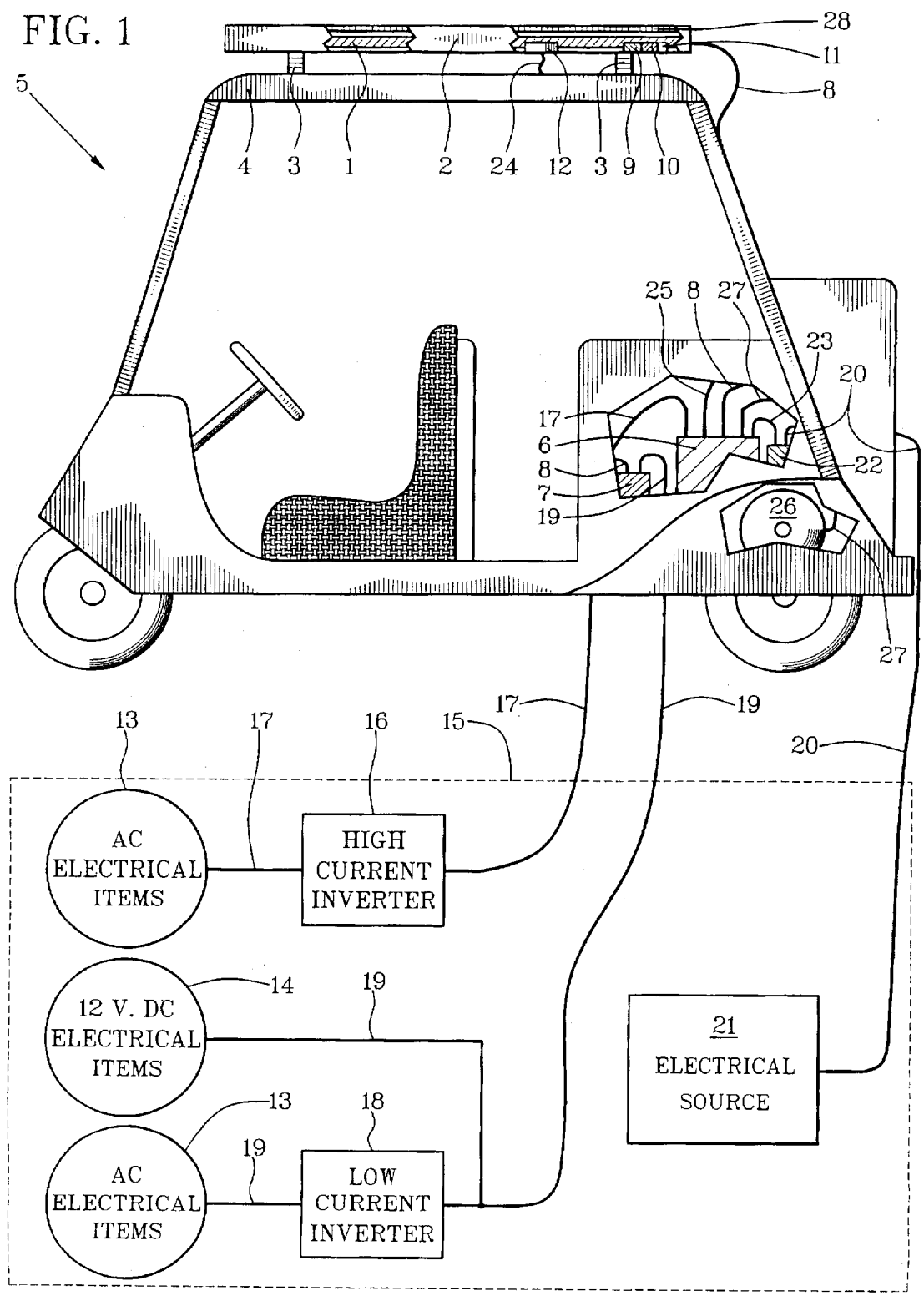
FIG. 1 is a partially cutaway side view in relation to a structure in which electrical items and an electrical source are positioned.

Reference is made first to FIG. 1. Photovoltaic (PV) panels 1 are positioned to receive solar energy in a photovoltaic (PV) frame 2 having mounting brackets 3 with which the PV frame 2 is attached to and maintained a design distance above an attachment portion, preferably a roof 4, of a vehicle that is preferably a golf cart 5. The design distance above the roof 4 is sufficient to allow cooling air to communicate between the PV frame 2 and the roof 4.

Electricity generated by the PV panels 1 is transmitted to a primary battery 6, and optionally to a secondary battery 7 through a PV-generator line 8 with leads to a primary control regulator 9 and to an optional secondary control regulator 10 as selected by a regulator switch 11. The primary control regulator 9 is a charge controller which is designed to direct current from the PV panels 1 to the primary battery 9 when current is not being supplied by an independent power source. The secondary control regulator 10 is a charge controller which is designed to direct low-volume current to a low-current battery and a low-current inverter when current is not being supplied by the independent power source.

The regulator switch 11 can be controlled automatically or manually as designed and can be a three-way on-off-on type if a secondary battery 7 is employed or an on-off switch if only a primary battery 6 is employed. Also, the PV-generator line 8 need have only one lead line to the primary control regulator 9 if only the primary battery 6 is employed.

A fan 12 can be provided to circulate cooling air over surfaces of the PV panels 1 and between the PV frame 2 and the roof 4 in accordance with particular design preferences. The fan 12 is controlled automatically for operation as and when advantageous for aiding current generation and flow at lower temperatures than occur on roofs 4 and other top portions of vehicles when the sun is hot. A fan 12 is effective to the extent that power to run it does not exceed generating efficiency and current-flow efficiency added by its cooling effect on the PV panels 1 and related wiring. It is important, therefore, that the fan 12 be highly efficient, positioned effectively and thermostatically controlled for use only at high temperatures.

In addition to an efficient vehicle-operating system, a primary object of this vehicle-top solar-power generator is to provide current to alternating current (AC) electrical items 13 and to direct current (DC) electrical items 14 in a structure 15 near the vehicle when and to an extent that more current is generated by the PV panels 1 than necessary to keep a vehicle battery or primary battery 6 charged. Particularly intended AC electrical items 13 and DC electrical items 14 are electrical appliances in a nearby or adjoining home, recreational vehicle, office, boat or car. A high-current inverter 16 is provided designedly in a high-current output line 17 in electrical communication between the primary battery 6 and AC electrical items 13. For use of the optional secondary battery 7, a low-current inverter 18 is provided in a low-current output line 19 between the secondary battery 7 and AC electrical items 13 that can be the same or different AC electrical items 13 that receive power through the high-current inverter 16. Powered directly through the low-current output line 19 can be the DC electrical items 14 which are generally 12-volt DC electrical items such as 12-volt DC appliances and motors. For designedly larger photovoltaic systems and for particular applications, direct current can be provided to electrical items directly from the high-current output line 17.

When needed to supplement generation by the PV panels 1, current to charge the primary battery 6 is transmitted through a source line 20 from an electrical source 21 to a battery charger 22 and then through a charge line 23. Current to the fan 12 is transmitted through a fan line 24 from the PV-generator line 8. Current from the primary control regulator 9 to the primary bakery 6 is transmitted through output line 25. Current is provided to a vehicle motor 26 through a motor line 27.

The electrical source 21 can be a commercial power line or a standby generator powered by a prime-mover engine.

A light-conductive cover 28 can be positioned on top of the PV frame 2 for protection of the PV panels 1 against objects and dust. It can be plexiglass, screen or other type of protective covering.

Figure 2:
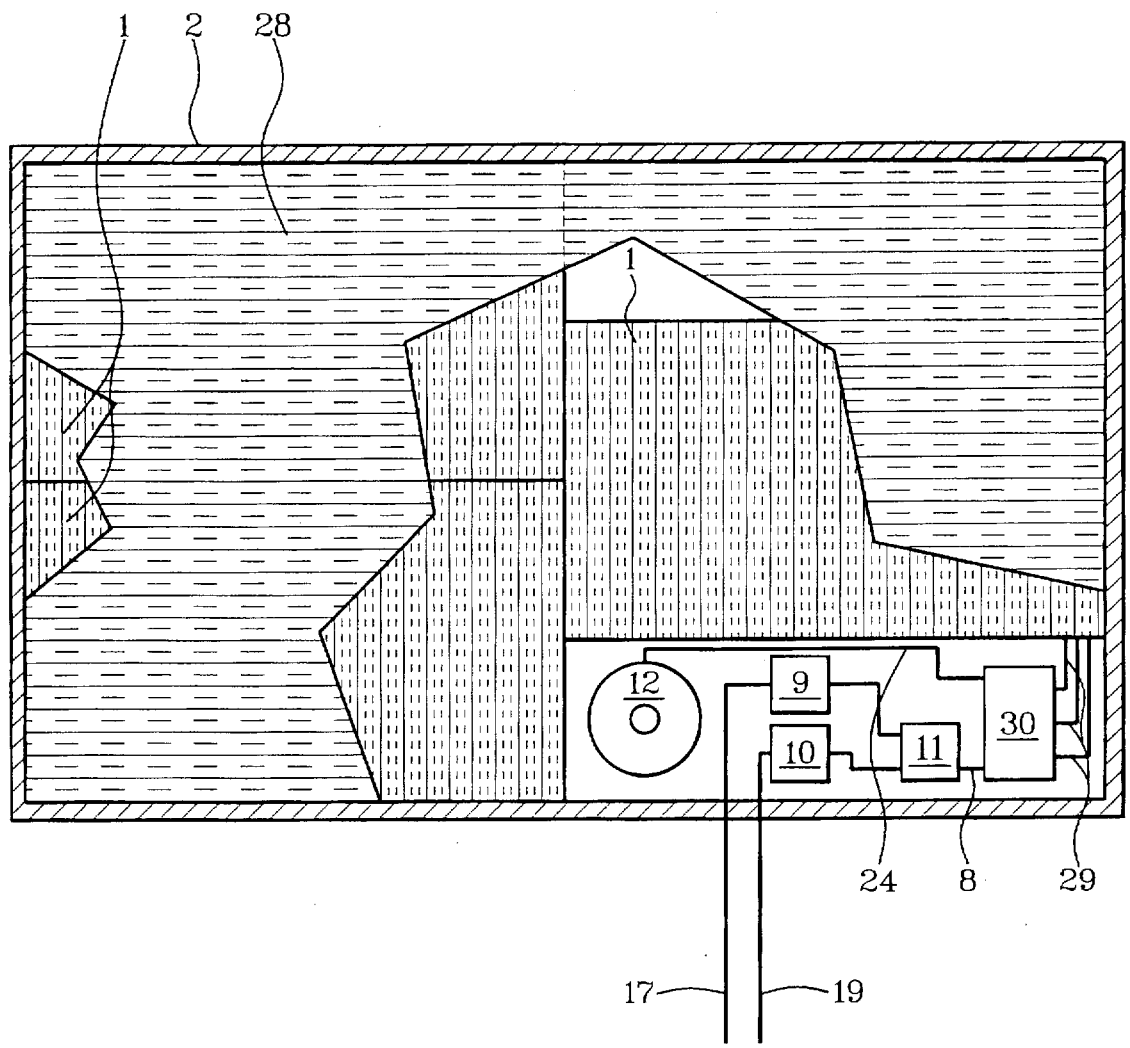
FIG. 2 is a partially cutaway top view.

Referring to FIG. 2, current from the PV panels 1 is collected through collection lines 29 at a junction block 30. The current is then directed to the fan 12 through the fan line 24, to the primary control regulator 9 and the secondary control regulator 10 for distribution through the high-current output line 17 and the low-current output line 19 respectively in accordance with design preferences. The PV panels 1 can be any of a variety of photovoltaic devices. They can be small units in relatively high pluralities to minimize resistance before power take-off or large in relatively lower pluralities to maximize working surface area. Conventional attachments and connections are assumed for the working relationship of parts illustrated. The fan 12 is positioned to circulate air selectively over and under the PV panels 1 and can be either a blade type, a centrifugal type, squirrel-cage type or other type of fan. The control regulators 9 and 10 can be positioned on the PV frame 2 or on the vehicle such as the golf cart 5. The regulator switch 11 also can be positioned wherever convenient in relation to the junction block 30.

Figure 3:
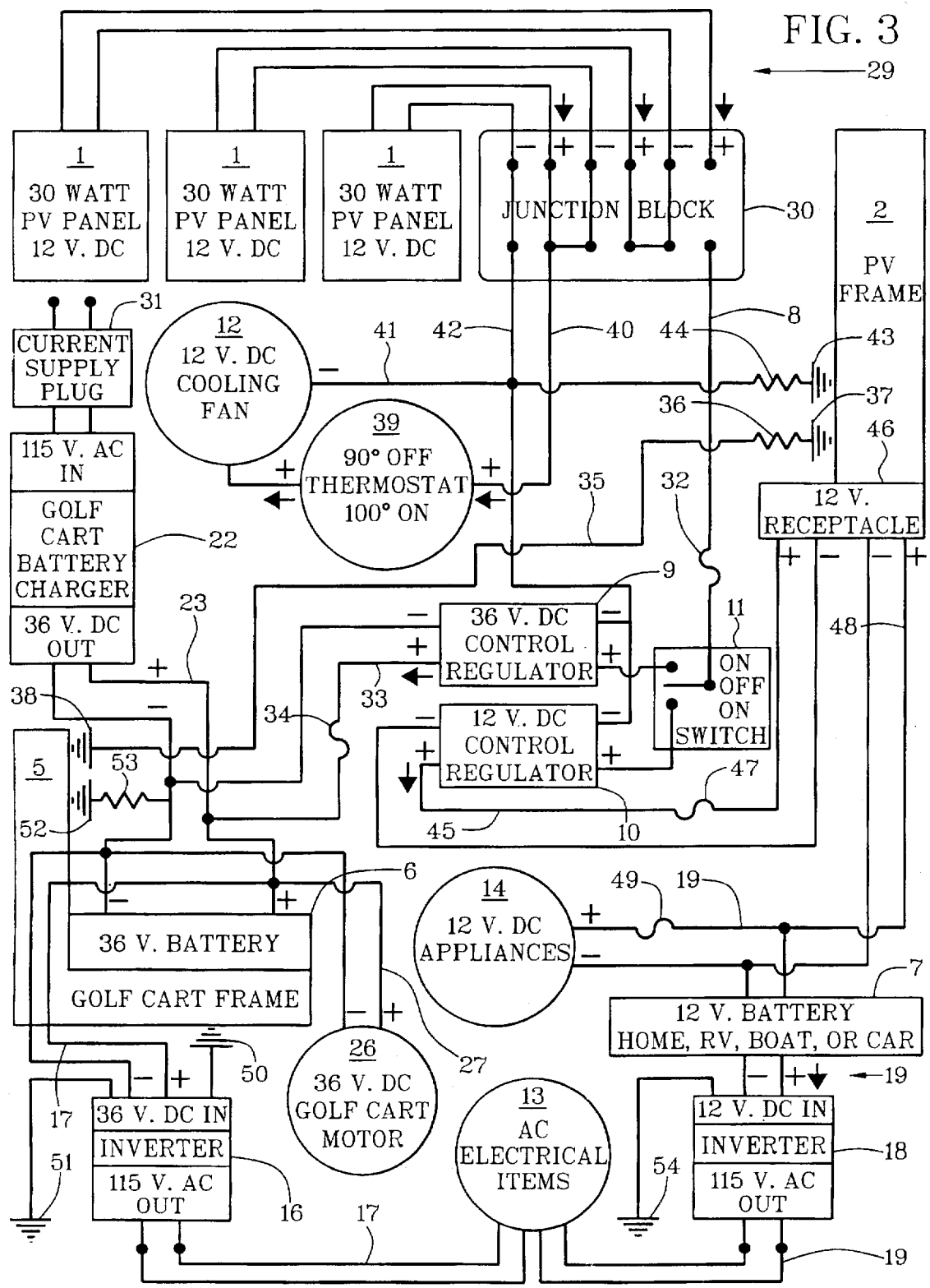
FIG. 3 is an operational diagram.

Referring to the operational diagram of FIG. 3 in combination with FIGS. 1-2, the source line 20 shown in FIG. 1 provides current to a current-supply plug 31 with 115 volts of AC current in to the golf-cart battery charger 22. The primary battery 6, which is a golf-cart battery in this embodiment, is charged with 36 volts of DC current from the battery charger 22 when necessary due to inadequacies of generation from PV panels 1 as a result of unfavorable weather or extensive use of energy stored in the primary battery 6.

When the PV panels 1 are operative, current is collected at the junction block 30 and routed to either the primary control regulator 9 or the secondary control regulator 10 selectively with the regulator switch 11. Collection lines 29 are defined to include output positive lines and return negative lines combined as illustrated. All other current lines such as the charge line 23, the regulator lines, the inverter lines and the lines to electrical items also include both positive and negative components unless indicated differently.

A generator-line fuse 32 in the PV-generator line 8 prevents overload of low-resistant and low-loss components electrically downstream from the PV-generator line 8. A primary-regulator line 33 supplies charge current to the primary battery 6 similarly to supply of current through charge line 23. A regulator-line fuse 34 further prevents downstream overload for allowing safe use of wire and connections with low surface-area loss and other component efficiencies to maximize system efficiency.

The PV frame 2 and the golf-cart frame 5 are grounded to each other with a frame-to-frame ground line 35. The frame-to-frame ground line 35 is preferably a shielded two-wire cable having an inner-connect resistor 36 connected to a PV-frame ground 37. A cart-frame ground 38 can be connected to the golf-cart frame 5 without a resistor.

The cooling fan 12 is controlled automatically by a thermostat 39 with direct current from the junction block 30 through thermostat line 40. Current for the cooling fan 12 can be directed from a single PV panel 1 or more as designed for particular types and sizes of PV components employed. The thermostat 39 can be adjustable or set at a "min-max" design such as 90 degrees for switching off and 100 degrees for switching on. A fan return line 41 is connected to a junction-block return line 42 and grounded to the PV frame 2 with a cooling-fan ground 43 having a fan-ground resistor 44.

A secondary regulator line 45 from the secondary control regulator 10, which is a 12-volt DC control regulator in the preferred embodiment, directs current to a 12-volt receptacle 46 on the PV frame 2. A secondary-line fuse 47 prevents overload of components and connections that are electrically downstream from the secondary control regulator 10.

Leading out of the 12-volt receptacle 46 is a secondary connector line 48 which supplies current alternatively to either the secondary battery 7 and/or to the DC electrical items 14 which are 12-volt DC appliances in this embodiment. Leading out of the secondary battery 7 to the 12-volt DC appliances 14 and to the low-current inverter 18 at separate take-off positions is the low-current output line 19. A low-current fuse 49 is provided in the low-current output line 19 electrically intermediate the secondary battery 7 and the DC electrical items 14. Downstream electrically from the low-current inverter 18, the low-current output line 19 is extendable and connectable further to AC electrical items 13.

The secondary battery 7 can be sized and positioned designedly in a structure 15, described in relation to FIG. 1, such as a home, recreational vehicle, boat, car or other structure. In this embodiment, it is represented as a 12-volt battery.

AC electrical items 13 can be powered through high-current output line 17 that is extended from the primary battery 6 and through the high-current inverter 16. Extended also from the primary battery 6 is the motor line 27 through which current is supplied to the vehicle motor 26 which is indicated as a golf-cart motor in this embodiment.

A high-current frame ground 50 and a high-current earth ground 51 are extended from the high-current inverter 16. A return frame ground 52 having a ground resistor 53 is provided in the return line of the charge line 23.

A low-current earth ground 54 is extended from the low-current inverter 18.

Although the preferred embodiment relates to a golf cart 5 as the vehicle with related sizes and volumes of components, this invention is intended for use on much larger vehicles of all types with appropriate and foreseeable sizes, types and pluralities of components. An embodiment for a golf cart 5 is a pilot embodiment of this invention.

A new and useful vehicle-top solar-power generator having been described, all such modifications, adaptations, substitutions of equivalents, combinations of parts, pluralities of parts, applications and forms thereof as described by the following claims are included in this invention.

Having thus described my invention, I claim:

1. A vehicle-top solar-power generator comprising:
   a photovoltaic frame having mounting brackets with which the photovoltaic frame is positioned on a vehicle at a design distance vertically above an attachment portion of the vehicle;
   one or more photovoltaic panels positioned horizontally in the photovoltaic frame;
   a junction block on the photovoltaic frame having positive connectors in electrical communication with positive electrical output lines from the photovoltaic panels and having negative connectors in electrical communication with negative electrical return lines to the photovoltaic panels;
   negative connectors on the junction block being in electrical communication with positive connectors on the junction block;
   a tandem photovoltaic-generator line having a positive line attached in electrical communication to a positive connector and to a negative line attached in electrical communication to a negative connector on the junction block;
   a primary control regulator and a secondary control regulator attached to the photovoltaic frame;
   a regulator switch having a moveable contact member with an input portion in electrical communication with the positive line of the tandem photovoltaic-generator line and an output portion moveable selectively from an off position between a positive lead to the primary control regulator and a positive lead to the secondary control regulator;
   the moveable contact member being positional in contact with either the positive lead to the primary control regulator or the positive lead to the secondary control regulator selectively;
   a return line in negative-pole return-electrical communication from the primary control regulator and the secondary control regulator to a negative line in the tandem photovoltaic-generator line for return flow to the junction block;
   a primary battery on the vehicle;
   a tandem primary-regulator line in positive and negative electrical communication between the primary control regulator and the primary battery;
   a vehicle electrical motor on the vehicle in tandem electrical communication with the primary battery;
   a high-current inverter having tandem electrical input communication with the primary battery and having tandem electrical output communication with select remote alternating current electrical items;
   a battery charger in tandem electrical communication of current from a current-supply connector to the primary battery;
   a tandem secondary regulator line in positive and negative electrical communication between the secondary control regulator and a low-current receptacle on the photovoltaic frame;
   a tandem secondary connector line in electrical communication between the low-current receptacle and a remote low-current battery; and
   a low-current inverter in electrical transmission of direct current from the remote low-current battery to alternating current for select alternating-current items.

2. A vehicle-top solar-power generator as described in claim 1 and further comprising:
   a cooling fan positioned on the photovoltaic frame in airflow relationship to select portions of the photovoltaic panels.

3. A vehicle-top solar-power generator as described in claim 2 wherein:
   the cooling fan is powered by current from the photovoltaic panels.

4. A vehicle-top solar-power generator as described in claim 3 wherein:
   electrical current is communicated to the cooling fan by a positive electrical line in communication with at least one positive connector on the junction block; and
   electrical current is returned from the cooling fan by a negative electrical line in communication with at least one negative connector on the junction block.

5. A vehicle-top solar-power generator as described in claim 4 and further comprising:
   a thermostatically controlled regulator of current in the positive electrical line to the cooling fan.

6. A vehicle-top solar-power generator as described in claim 5 and further comprising:
   a frame ground in electrical communication between the negative electrical line from the cooling fan and the photovoltaic frame.

7. A vehicle-top solar-power generator as described in claim 6 and further comprising:
   a fan-ground resistor in design resistance of electrical communication from the negative electrical line to the photovoltaic frame.

8. A vehicle-top solar-power generator as described in claim 1 and further comprising:

a frame-to-frame ground line in electrical communication between a frame of the vehicle and the photovoltaic frame.

9. A vehicle-top solar-power generator as described in claim 8 and further comprising:

a frame-to-frame-ground resistor in design resistance of electrical communication between the frame-to-frame ground line and the photovoltaic frame.

10. A vehicle-top solar-power generator as described in claim 9 wherein:

the frame-to-frame ground line is a shielded two-wire cable.

11. A vehicle-top solar-power generator as described in claim 1 and further comprising:

a low-current output line in electrical communication from the secondary connector line to select low-current items.

12. A vehicle-top solar-power generator as described in claim 1 and further comprising:

a generator-line fuse in the photovoltaic-generator line;

a regulator-line fuse in the primary-regulator line; and a low-current fuse in the low-current output line.

13. A vehicle-top solar-power generator as described in claim 1 and further comprising:

a high-current earth ground in electrical communication from the high-current inverter;

a low-current earth ground in electrical communication from the low-current inverter;

a ground resistor in resistance of electrical communication between a return line from the primary battery and a frame ground in electrical communication with a frame of the vehicle; and a high-current frame ground in electrical communication between the high-current inverter and the frame of the vehicle.

* * * * *